United States Patent [19]

McCumber

[11] Patent Number: 5,575,023
[45] Date of Patent: Nov. 19, 1996

[54] LOFT-STYLE BED ASSEMBLY KIT AND A METHOD FOR ASSEMBLING A LOFT-STYLE BED USING THE KIT

[75] Inventor: Tom L. McCumber, 47 South Blvd., #2N, Oak Park, Ill. 60302

[73] Assignee: Tom L. McCumber, Peoria, Ill.

[21] Appl. No.: 377,035

[22] Filed: Jan. 23, 1995

[51] Int. Cl.$^6$ .................................................. A47C 19/20
[52] U.S. Cl. ................................ 5/9.1; 5/200.1; 5/207; 5/282.1; 403/403; 403/231
[58] Field of Search ................. 5/2.1, 8, 9.1, 200.1, 5/201, 207, 282.1, 310; 403/403, 231, 205, 382; 248/247, 248

[56] References Cited

U.S. PATENT DOCUMENTS

| | | |
|---|---|---|
| 11,449 | 8/1854 | Willard . |
| 695,820 | 3/1902 | Lochner . |
| 1,141,210 | 6/1915 | Pirson ............................ 403/231 |
| 1,195,637 | 8/1916 | Anderson . |
| 1,235,336 | 7/1917 | Lathrop . |
| 1,275,774 | 8/1918 | Silvester . |
| 1,325,917 | 12/1919 | Spencer ............................ 5/310 |
| 1,357,787 | 11/1920 | Locklin . |
| 2,774,976 | 12/1956 | Ross . |
| 2,853,716 | 9/1958 | Sevcik ............................ 5/8 |
| 3,693,199 | 9/1972 | Winterthur . |
| 3,854,268 | 12/1974 | Gutner ............................ 403/403 |
| 4,450,597 | 5/1984 | Hull . |
| 5,003,650 | 4/1991 | Caya . |
| 5,111,540 | 5/1992 | Caya . |
| 5,150,484 | 9/1992 | Whitten, Jr. . |
| 5,263,210 | 11/1993 | Pollard . |

FOREIGN PATENT DOCUMENTS

| | | | |
|---|---|---|---|
| 215191 | 5/1924 | United Kingdom ............... 5/9.1 |
| 373777 | 6/1932 | United Kingdom ............... 5/8 |
| 568759 | 4/1945 | United Kingdom ............... 5/8 |

*Primary Examiner*—Michael F. Trettel
*Attorney, Agent, or Firm*—Hill, Steadman & Simpson

[57] ABSTRACT

A loft-style bed assembly kit and a method for assembling a loft-style bed using the kit are provided. The loft-style bed assembly kit has corner brackets, angle braces, bed frame clips, and connecting hardware whereby assembling the kit provides a loft-style bed assembly. The assembly kit can be used to provide several orientations of a lofted bed frame and a floor mounted bed frame.

16 Claims, 3 Drawing Sheets

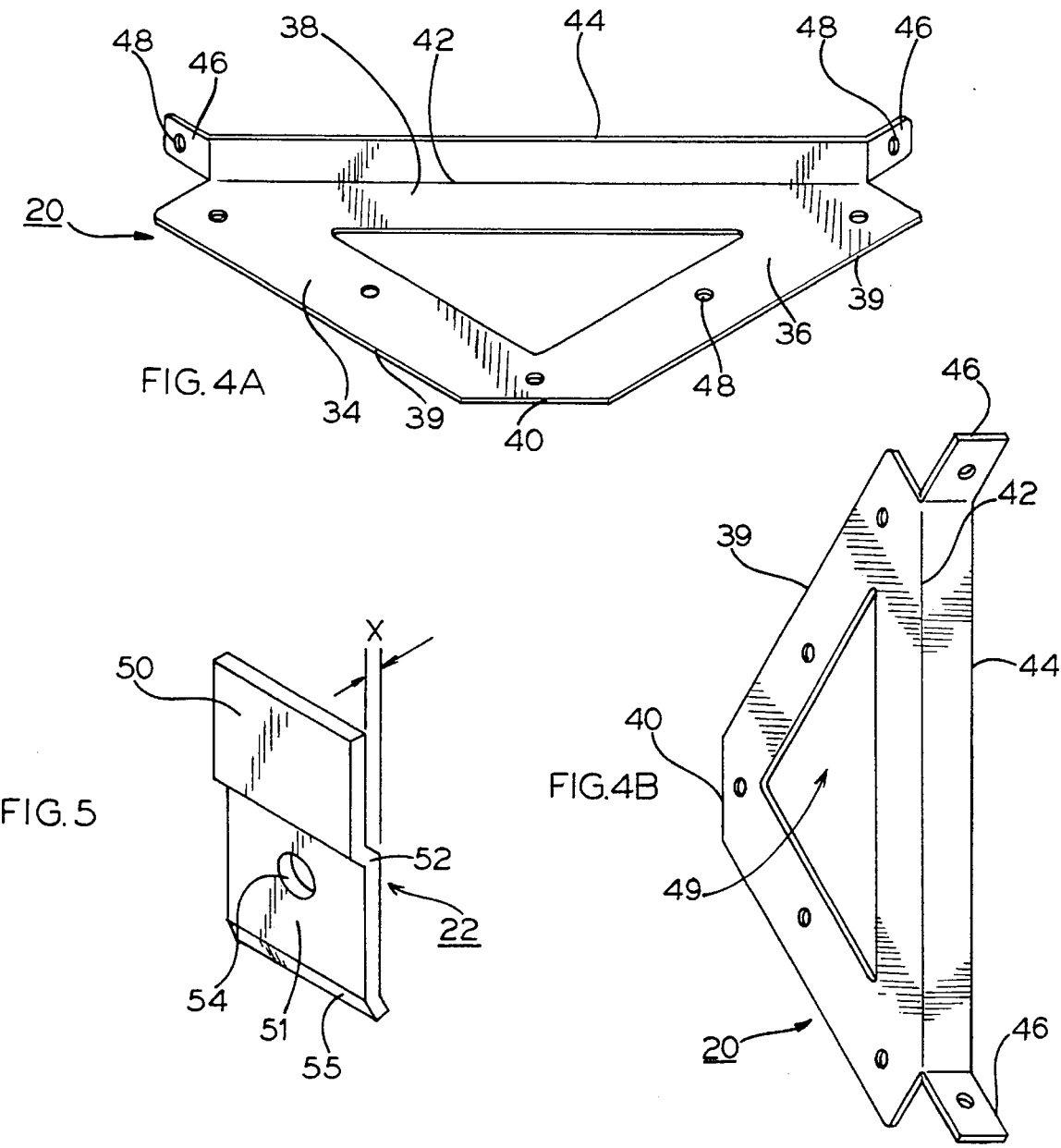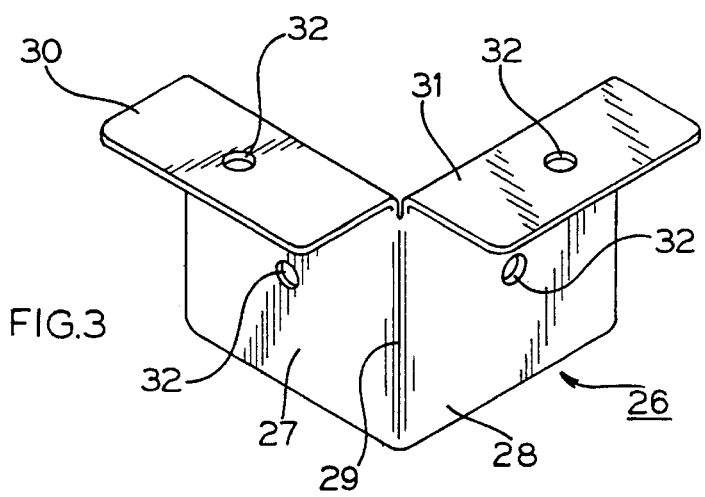

LOFT-STYLE BED ASSEMBLY KIT AND A METHOD FOR ASSEMBLING A LOFT-STYLE BED USING THE KIT

BACKGROUND OF THE INVENTION

The present invention is generally related to bed frames and more specifically to a loft-style bed assembly kit for use with standard bed frames and supplied necessary lumber and a method for assembling same.

Various styles of beds and bed frame assemblies are known. One such type of bed assembly is a bunk bed in which two beds are arranged such that one is above the other. Stacking or bunking of the beds is commonly done to conserve floor space in a room. Conservation of space is commonly needed in a child's bedroom or in a dormitory room in which the beds often take up most of the space in the room.

To better utilize the space in a small dormitory room, the residents often "loft" their beds (i.e., elevating the bed a distance above the floor). Lofting of the bed frames is commonly done by constructing a support framework to suspend the beds several feet above the floor. Doing this provides room beneath the bed for a desk, a sofa, etc.

Several problems arise however with the lofting of beds in a dormitory room. For example, often the residents do not have enough mechanical skill to design and properly construct a lofted bed assembly that would be sturdy enough to be safely used.

Another problem with the lofting of beds is that a universal type design is not usually feasible since the rooms usually have different configurations. Also, the personal taste of the residents dictates what style and arrangement of the beds would be most conducive to their setting.

As a result, a need has arisen for a loft-style bed assembly kit and a method for assembling a loft-style bed using the kit. The assembly kit must provide a completed loft-style bed that is versatile, safe and easily constructed.

SUMMARY OF THE INVENTION

Accordingly, the present invention provides a versatile loft-style bed assembly kit and a simple method for assembling a loft-style bed using the kit.

To this end, in an embodiment, the present invention provides a loft-style bed assembly kit for use with supplied necessary lumber and a standardized bed frame. The kit has a plurality of corner brackets, a plurality of angle braces, a plurality of bed frame clips and connecting hardware whereby assembling the kit provides a loft-style bed frame assembly that is both sturdy and easily constructed.

In an embodiment, the connecting hardware provided in the loft-style bed assembly kit is a plurality of lag screws.

In an embodiment, the loft-style bed assembly kit provides corner brackets having a first plate including a first portion having an end and a side and a flange portion integrally formed with the first portion at the end thereof and arranged at a 90° angle therewith, and a second plate substantially identical to the first plate and integrally formed with the first plate adjoining at the side thereof and arranged at a 90° angle therewith such that the flange portions of the first and second plates are directed away from each other and do not contact one another. The first plate, second plate and the flange portions each have a hole therein for connecting the corner brackets to beams of lumber which are supplied for the structure of the bed frame assembly. The connecting hardware is used to fasten the bracket to the lumber.

In an embodiment, the loft-style bed assembly kit provides a bed frame clip constructed from a metal bar having a first portion and a second portion with a bend therebetween so that the first portion is substantially parallel to the second portion and offset a distance therefrom. The bed frame clip is provided with a mounting hole so that it can be connected by a lag screw to the lumber. The bed frame clips are used to support the bed frame within the structural framework of the loft bed assembly.

In an embodiment, the loft-style bed assembly kit provides an angle brace which has a right triangular portion including two equal legs each having an outer edge and a hypotenuse having an outer edge. The angle brace also has a flange portion integrally formed with the outer edge of the hypotenuse and arranged at a 90° angle to the triangular portion. The flange portion also has a tab thereof bent in the plane of the flange portion away from the triangular portion to be parallel to the outer edge of a corresponding leg of the triangular portion. The angle brace also has several holes for mounting the angle brace to the lumber of the bed frame. For this purpose, the lag screws are used.

In an embodiment, the angle brace provides a slight bend at each outer edge of each leg of the triangular portion.

In an embodiment, the bed frame clip is constructed of 12 gauge cold rolled steel, the angle brace is constructed of 16 gauge cold rolled steel and the corner bracket is constructed of 14 gauge cold rolled steel.

In an embodiment, the present invention provides a method for assembly of a loft-style bed kit having the following steps. The first step is providing a loft-style bed assembly kit of the present invention having four corner brackets, eight angle braces, four bed frame clips and associated connecting hardware. The method also has a step of providing two end beams, two side beams, four legs and at least one step. Another step involves positioning the beams against the periphery of a rectangular bed frame. Such a bed frame is commonly provided by the university in a dormitory situation.

The next step of the present invention involves connecting each of the four corner brackets to an end of each of the four legs using the connecting hardware. Next, one of the corner brackets is connected to each of the four junction points of the beams surrounding the rectangular bed frame.

The present invention also has a step of connecting the eight angle braces to the legs and to the side and end beams with the connecting hardware. This is done by connecting one of the angle braces to a leg and a side beam and another angle brace to the same leg and an end beam. This step is repeated for each leg. Thus, there are two angle braces connecting a leg at each corner of the rectangular bed frame.

The present invention also provides connecting at least one step to two of the legs at an end of the assembly. The step is connected at an appropriate height so that the resident can climb to the lofted bed.

The frame assembly is then inverted so that the assembly is supported by the four legs. Another step of the invention is connecting each of the four bed frame clips to an interior side of the two end beams near the corners with the connecting hardware. Finally, the user lifts the rectangular bed frame onto the assembly so that the rectangular bed frame is held by the four bed frame clips within the side and end beams.

It is, therefore, an advantage of the present invention to provide a loft-style bed assembly kit and a method for assembling a loft-style bed using the kit in a simple manner.

A further advantage of the present invention is to provide a loft-style bed assembly kit having sturdy construction for safety.

Another advantage is to provide a loft-style bed assembly kit that is convenient and easily assembled to form a loft-style bed.

A still further advantage of the present invention is to provide a loft-style bed assembly kit that is reusable.

Yet another advantage of the present invention is to provide a loft-style bed assembly kit that is both versatile and modular so that the user may maximize floor space and use the invention in any configuration that is appropriate and most convenient. Moreover, another advantage of the present invention is to provide a loft-style bed assembly kit that provides the necessary hardware in component pieces which may be used no matter which arrangement of the beds is desired by the user.

And, another advantage of the present invention is to provide a loft-style bed assembly kit that can be used with standard supplied bed frames, such as those provided by a university in a dormitory.

Additional features and advantages of the present invention are described in, and will be apparent from, the detailed description of the presently preferred embodiments and from the drawings.

BRIEF DESCRIPTION OF THE DRAWINGS

FIG. 3 illustrates a perspective view of an embodiment of a corner bracket of the bed assembly kit of the present invention.

FIGS. 4A and 4B illustrate a perspective view of an embodiment of a corner brace of the bed assembly kit of the present invention.

FIG. 5 illustrates a perspective view of an embodiment of a bed frame clip of the bed assembly kit of the present invention.

DETAILED DESCRIPTION OF THE PRESENTLY PREFERRED EMBODIMENTS

The present invention provides a loft-style bed assembly kit for use with wooden beams and a supplied metal bed frame. When assembled to the lumber, the loft-style bed assembly kit provides a lofted support for the bed frame so that a dormitory style bed may be elevated above the floor to provide more efficient room space usage.

Figure 1:
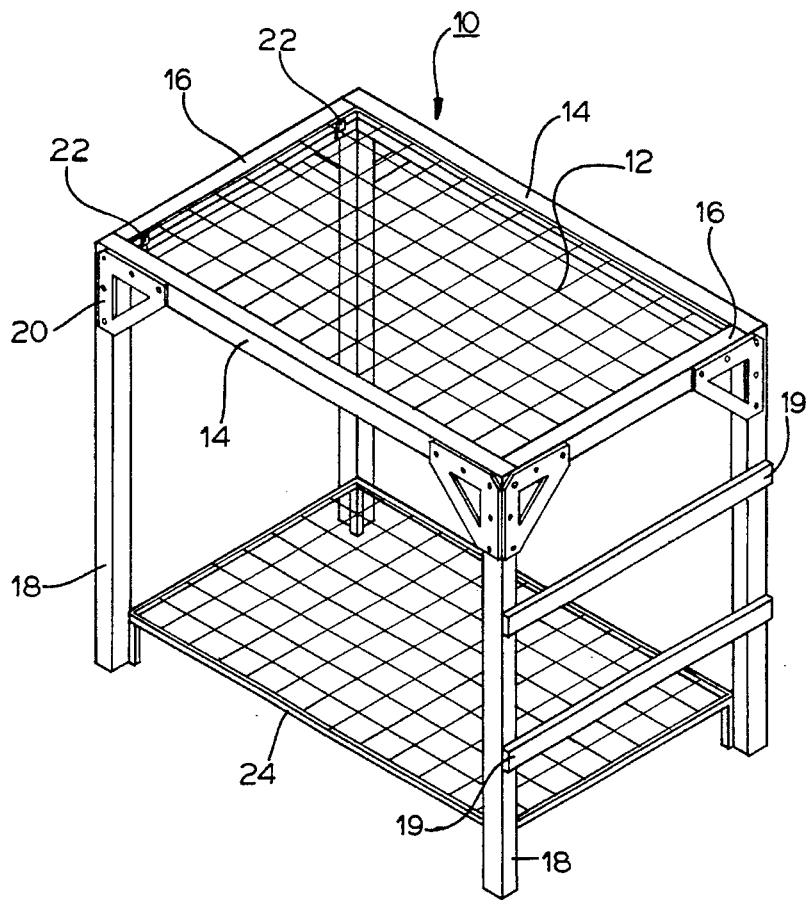
FIG. 1 illustrates a perspective view of an embodiment of a loft-style bed assembly utilizing the bed assembly kit of the present invention.

Now referring to embodiments of the present invention as illustrated in the figures, FIG. 1 shows an exemplary embodiment of the loft-style bed assembly 10. As shown, a supplied metal bed frame 12 is circumscribed by a pair of side beams 14 and a pair of end beams 16. To provide the bed frame 12 at a height above the floor, four legs 18 are provided and connected to the side beams 14 and the end beams 16. To provide access to the upper bunk, a pair of steps 19 may be provided. The steps 19 are connected to the legs 18. Angle braces 20 are used to connect the legs 18 to the side beams 14 and the end beams 16. Preferably, eight angle braces 20 are implemented. The angle braces 20 provide increased rigidity and square the bed assembly.

To support and to secure the bed frame 12, bed frame clips 22 are provided. Typically, four clips 22 are used to provide adequate support for the bed frame 12 and any loads placed on the bed frame 12. The bed frame clips 22 are secured to the end beams 16 near the corners thereof. In addition, a floor mount bed frame 24 is provided directly beneath the lofted bed frame 12. In this manner, the beds can be bunked which greatly increases the available floor space in a small room.

Figure 2:
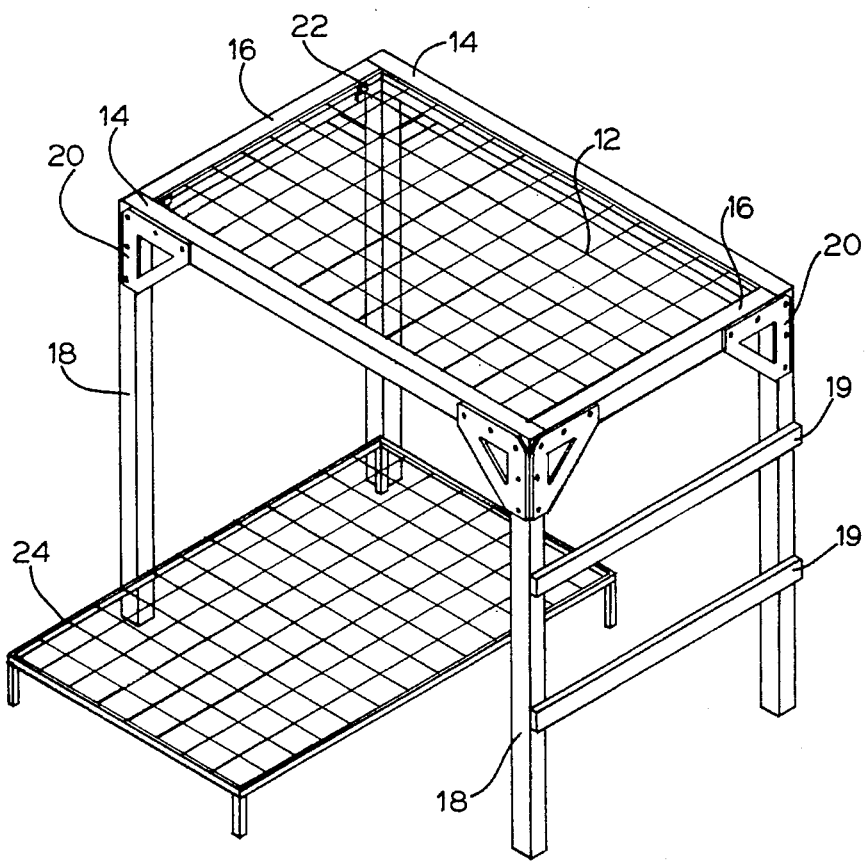
FIG. 2 illustrates a perspective view of another embodiment of a loft-style bed assembly utilizing the bed assembly kit of the present invention.

FIG. 2 represents another embodiment of a loft-style bed assembly in which like elements are represented by like numerals. The embodiment illustrated in FIG. 2 differs from that of FIG. 1 in that the floor mount bed frame 24 is perpendicular to the lofted bed frame 12. This embodiment provides a different type arrangement to give added versatility to the user. For example, a dresser or other item could be placed in the area under the top frame 12 adjacent to the floor mount bed frame 24.

Thus, the present invention has the advantage that either embodiment (as illustrated in FIGS. 1 and 2) may be constructed using the exact same assembly kit. No different kit materials are required, which gives the user greater versatility without any added expense or complications.

The present invention provides a loft-style bed assembly kit. The kit has three primary hardware components: angle braces, bed frame clips and corner brackets. Preferably, the kit has eight angle braces 20, four bed frame clips 22 and four corner brackets 26. Of course, other quantities of any of the primary hardware components may be implemented by those having ordinary skill in the art.

Figure 8:
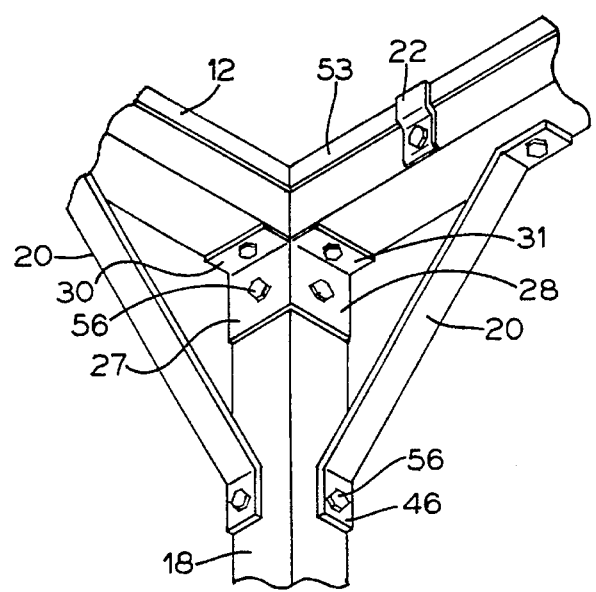
FIG. 8 illustrates a perspective view of an enlarged detail of FIG. 6 showing a corner bracket, angle braces and bed frame clip of the present invention.
Figure 6:
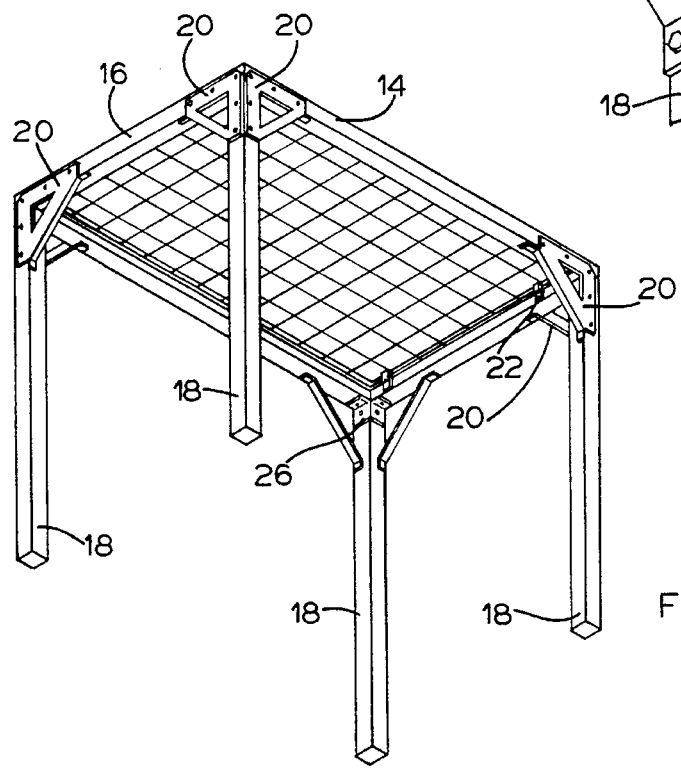
FIG. 6 illustrates a perspective view of a third embodiment of a loft-style bed assembly utilizing the bed assembly kit of the present invention.

An embodiment of the corner bracket 26 is illustrated in FIG. 3. The corner bracket 26 has a first plate 27 and a second plate 28. The two plates 27, 28 have a conjoining bend 29 to form a 90° angle therebetween. The first plate 27 has a first flange 30, and similarly, the second plate 28 has a second flange 31. When assembled as shown in FIGS. 6 and 8 and as described below, the corner bracket 26 secures one of the legs 18 to the beams 14, 16 surrounding the bed frame 12. Preferably, the corner bracket 26 is integrally formed as a single part.

An embodiment of the angle brace 20 is illustrated in FIGS. 4A and 4B. FIG. 4A shows the interior side of the angle brace 20 and FIG. 4B shows the exterior side of the angle brace 20. The angle brace 20 has primarily a triangular construction with a first leg 34 and a second leg 36 forming a right angle. Opposite the legs 34, 36 is a hypotenuse 38. Also illustrated is an outer edge 39 on each of the legs 34, 36. In an embodiment, the outer edge 39 may have a slight bend of approximately 5°.

Figure 7:
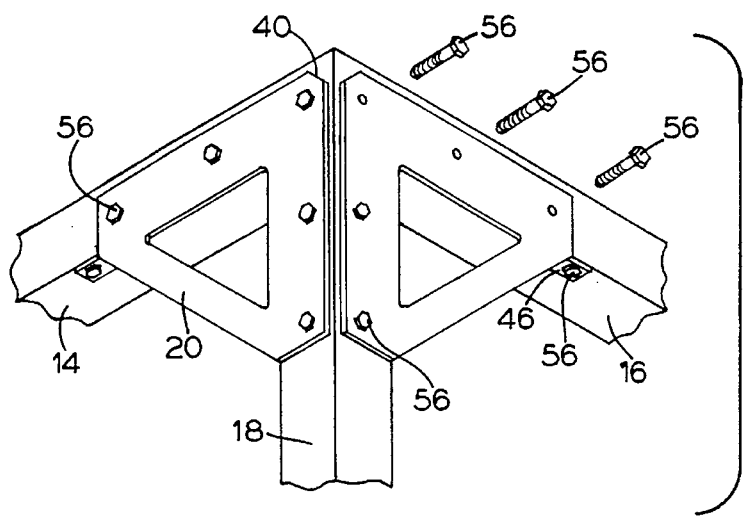
FIG. 7 illustrates a perspective view of an enlarged detail of FIG. 6 showing the angle braces of the present invention.

Referring again to FIG. 4A, the angle brace 20 has a chamfered corner 40. The chamfered corner 40 provides improved safety after the loft-style bed is assembled. As shown in FIG. 7, the chamfered corner 40 avoids having two sharp corners at each corner of the bed frame 12.

In addition, the hypotenuse 38 has an outer end bend 42 conjoining a flange 44 that runs the length of the hypotenuse 38. The flange 44 is bent at a 90° angle from the triangular portion of the angle brace 20. At each end of the flange 44 is a tab 46 having a mounting hole 48. The tab 46 is bent at an angle from the flange 44. Each tab 46 is thus parallel with the corresponding leg 34 or 36 of the triangular portion and offset a distance therefrom.

The angle braces 20 are assembled to the beams 14, 16 and legs 18 as illustrated in FIGS. 6–8. The angle braces 20 support the legs 18 at right angles to the beams 14, 16.

The loft-style bed assembly kit of the present invention further includes a plurality of bed frame clips 22. Preferably, four bed frame clips 22 are used to provide a sturdy and safe construction. Fewer clips could be used depending on the application and anticipated loads on the bed frame 12 supported by the clips 22. Of course, additional clips 22 may also be implemented.

An embodiment of the bed frame clip 22 is shown in FIG. 5. The bed frame clip 22 is preferably constructed from a metal bar having a first portion 50, a second portion 51 and a bend 52 therebetween such that the first portion 50 is approximately parallel with the second portion 51, but offset a slight distance therefrom designated at "x". The offset distance x is preferably slightly greater than the width of an end rail 53 of the bed frame 12 (see FIG. 8). In addition, a connecting hole 54 is provided in the second portion 51 of the bed frame clip 22.

Moreover, the second portion 51 of the bed frame clip 22 has an anchor flange 55 at the bottom thereof. As illustrated in the enlarged detail of FIG. 8, when the end frame clip 22 is mounted to the end beam 16, the anchor flange 55 is in tight contact with the end beam 16. In fact, as the bed frame clip 22 is fastened to the end beam 16 by connecting hardware, preferably a lag screw 56 via the mounting hole 54, the anchor flange 55 becomes embedded in the wood of the end beam 16. In addition, the weight of the bed frame 12 itself and a sleeper on a mattress further engage the anchor flange 55 into the wood of the end beam 16. Thus, the anchor flange 55 improves the holding strength of the bed frame clips 22.

FIG. 6 illustrates an embodiment of an assembled loft-style bed assembly using the assembly kit of the present invention. FIG. 7 is an enlarged detail view of the intersection of the leg 18 and the end beam 16 and the side beam 14. FIG. 8 is an enlarged detail view of the assembly from the inside of the loft bed assembly. It will become apparent from the following method of assembling the assembly kit of the present invention how the loft-style bed assembly as shown in FIG. 6 is constructed.

The method for assembling a loft-style bed kit of the present invention has the following simple steps. First of all, the user obtains a loft-style bed assembly kit as described above, including preferably the corner brackets 26, the angle braces 20, the bed frame clips 22 and associated connecting hardware, preferably lag screws 56. In a preferred embodiment, the bed frame clip 22 is constructed of 12 gauge cold rolled steel, while the angle brace 20 is 16 gauge and the corner bracket 26 is 14 gauge. Also, in a preferred embodiment the connecting hardware is an assortment of various lengths of ¼ inch lag screws 56. As a result of the simplified assembly kit of the present invention, very few tools are needed to assemble the loft-style bed using the assembly kit.

In addition to the bed assembly kit of the present invention, the necessary lumber for the frame and the legs must be obtained. In a preferred embodiment, the required lumber has a 4"×4" size of various lengths. The size of the steps 19 is preferably 2"×4". Additionally, a standard dormitory style bed frame 12 may be provided by, for example, a university in a dormitory situation.

To begin assembling the bed using the assembly kit of the present invention, the user begins by positioning the two end beams 16 and the two side beams 14 against the supplied bed frame 12. The next involves connecting each of the corner brackets 26 to an end of each of the four legs 18, respectively, using the connecting hardware, i.e. the lag screws 56. The lag screws 56 are inserted into the mounting hole 32 of the first plate 27 and the second plate 28 of the corner bracket 26 and are connected to the leg 18. The next step is to connect each of the corner brackets 26 to a corner, i.e. the junction point of the side beam 14 and end beam 16 which circumscribe the frame 12. Thus, one leg 18 is secured at each of the four corners. To secure the corner bracket 26 to the beams 14, 16, a lag screw is inserted in mounting holes 32 in the first flange 30 and the second flange 31.

The orientation of the corner bracket 26 is illustrated in FIG. 8. The corner bracket 26 connects the leg 18 to the side beam 14 and the end beam 16 to form a square corner. For completeness, FIG. 6 illustrates the manner in which all four legs are connected to the beams 14, 16.

In addition, FIG. 6 illustrates the connection of the angle braces 20. Referring now to the enlarged detail of FIG. 7, two angle braces 20 are shown connected to the leg 18. Also, the angle braces 20 are individually connected to the side beam 14 and the end 16. FIG. 8 also shows the interior connections of the angle brace 20 to the beams 14, 16 and the leg 18. As illustrated, the interior of one angle brace 20 mounts flushly against the leg 18 and the end beam 16. Similarly, the interior of another angle brace 20 mounts flushly to the leg 18 and the side beam 14.

Moreover, the tabs 46 of the flange 44 of the angle brace 20 are in contact with the respective beams 14, 16 and the leg 18. The lag screws 56 are used to mount the angle brace 20 via the mounting hole 48 through the tab 46 to the leg 18, the end beam 16 and the side beam 16. In addition, the mounting holes 48 in the legs 34, 36 of the angle brace 20 are used to connect the angle brace 20 to the beams 14, 16 and the leg 18. A total of eight angle braces 20 may be used, two at each corner, to provide rigidity to the bed assembly. The angle braces 20 maintain the legs 18, the side beams 14, and the end beams 16 at 90° angles to each other to square the bed assembly.

Also, once the above steps have been performed, the bed frame clips 22 are connected via the connecting hardware to the interior and near the ends of the two end beams 16. In a preferred embodiment, four of the bed frame clips 22 may be used. Next, at least one step 19 is connected across two of the legs 18 at one end of the assembly. The step 19 provides access to the lofted bed frame 12. Again the lag screws are used to connect the step 19 to the legs 18.

The final method step involves lifting the bed frame 12 over the top of the beams 14, 16. The frame 12 is thus positioned such that the end rail 53 of the bed frame 12 is seated and held within the offset distance x of the first portion 50 of the bed frame clips 22 (see enlarged detail of FIG. 8).

A floor mount bed frame 24 can also be positioned directly beneath the lofted bed frame 12 as shown in the embodiment of FIG. 1 or perpendicularly as shown in FIG. 2. The same assembly kit is utilized for either embodiment. Also, the floor mount bed 24 can be omitted as shown in FIG. 6.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A loft-style bed assembly kit for use with beams and standard bed frames to form a loft-style bed, the kit comprising:

a plurality of corner brackets;

a plurality of angle braces;

a plurality of bed frame clips;

connecting hardware whereby assembling the kit provides the loft-style bed;

wherein each of the corner brackets further comprises:

a first plate including a first portion having an end and a side and a flange portion integrally formed with the first portion at the end thereof and arranged at a 90° angle therewith, the first portion and the flange portion each having a mounting hole therein; and a second plate substantially identical to the first plate and integrally formed with the first plate conjoining the sides thereof, the first and second plates having a 90° angle therebetween such that the flange portions of first and second plate are directed away from each other so as not to contact one another.

2. The loft-style bed assembly kit of claim 1 wherein the connecting hardware further comprises:

a plurality of lag screws.

3. The loft-style bed assembly kit of claim 1 wherein each of the bed frame clips further comprises:

a bar having a first portion and a second portion with a bend therebetween so that the first portion is substantially parallel to the second portion and offset a distance therefrom.

4. A loft-style bed assembly kit for use with beams and standard bed frames to form a loft-style bed, the kit comprising:

a plurality of corner brackets;

a plurality of angle braces;

a plurality of bed frame clips;

connecting hardware whereby assembling the kit provides the loft-style bed;

wherein each of said angle braces further comprises:

a right triangular portion including two equal legs each having an outer edge, the triangular portion having a hypotenuse with an outer edge; and a flange portion integrally formed with the outer edge of the hypotenuse and arranged at a 90° angle to the triangular portion, the flange portion having a tab at each end thereof, the tabs bent in the plane of the flange portion and away from the triangular portion such that each tab is parallel to the outer edge of the corresponding leg of the triangular portion.

5. The loft-style bed assembly kit of claim 4 wherein each tab further comprises:

a mounting hole therein.

6. The loft-style bed assembly kit of claim 4 wherein each leg of the triangular portion further comprises:

an opening arranged within the legs and the hypotenuse.

7. The loft-style bed assembly kit of claim 4 wherein the triangular portion further comprises:

an opening arranged within the legs and the hypotenuse.

8. The loft-style bed assembly kit of claim 4 wherein the triangular opening further comprises:

a triangular opening arranged within the legs and the hypotenuse.

9. The loft-style bed assembly kit of claim 4 wherein each outer edge of each leg of the triangular portion further comprises:

a slight bend.

10. The loft-style bed assembly kit of claim 4 wherein the triangular portion further comprises:

a chamfered right angle corner.

11. A method for assembling a loft-style bed using an assembly kit, the method comprising the steps of:

a) providing a loft-style bed assembly kit including a plurality of corner brackets, a plurality of angle braces, a plurality of bed frame clips and connecting hardware;

b) providing a rectangular bed frame having two ends and two sides;

c) providing two end beams, two side beams and four legs;

d) individually positioning the two side beams against the two sides of the rectangular bed frame, respectively, and individually positioning the two end beams against the two ends of the rectangular bed frame, respectively, such that the side beam and the end beam form a junction point at each of the four corners of the rectangular bed frame;

e) connecting each of the plurality of corner brackets to an end of each of the four legs, respectively, using the connecting hardware;

f) connecting each of the plurality of corner brackets to each of the four junction points, respectively, using the connecting hardware;

g) connecting one of the plurality of angle braces to one of the legs and to one of the side beams and connecting another of the plurality of angle braces to the same leg and to one of the end beams with the connecting hardware;

h) repeating step g for each of the four legs;

i) connecting each of the plurality bed frame clips near the junction points using the connecting hardware; and k) placing the rectangular bed frame on the loft-style bed assembly so that the plurality of bed frame clips hold the bed frame within the side beams and the end beams.

12. The method of claim 11 further comprising the step of:

positioning a second bed frame under the lofted bed frame, the second bed frame oriented parallel to the lofted bed frame and located within the area defined by the four legs.

13. The method of claim 11 further comprising the step of:

positioning a second bed frame under the lofted bed frame, the second bed frame oriented perpendicularly to the lofted bed frame.

14. A corner bracket comprising:

a first plate including a first portion having an end and a side and a flange portion integrally formed with the first portion at the end thereof wherein the side and the flange portion are perpendicularly disposed with respect to each other and further wherein the first portion and the flange portion each have a mounting hole therein; and a second plate substantially identical to the first plate and integrally formed with the first plate conjoining at the sides thereof, the sides conjoining the first plate and the second plate have a 90° angle therebetween such that the flange portions of the first plate and the second plate are in the same horizontal plane and are directed away from each other so as not to contact one another.

15. A bed frame clip comprising:

a bar having a first portion and a second portion with a bend therebetween wherein the first portion is substantially parallel to the second portion and offset a distance therefrom and further wherein the second portion has an integrally formed lip angularly dispose with respect to a plane of the second portion in a direction away from a plane of the first portion.

16. An angle brace comprising:

a right triangular portion including two equal legs eac having an outer edge, the triangular portion having a hypotenuse with an outer edge; and a flange portion integrally formed with the outer edge of the hypotenuse and arranged at a 90° angle to the triangular portion, the flange portion having a tab at each end thereof, the tabs bent in the plane of the flange portion and away from the triangular portion such that each tab is parallel to the outer edge of the corresponding leg of the triangular portion.

* * * * *